(12) United States Patent
Engelhardt et al.

(10) Patent No.: US 8,487,461 B2
(45) Date of Patent: Jul. 16, 2013

(54) METHOD FOR OPERATING A WIND ENERGY INSTALLATION

(75) Inventors: Stephan Engelhardt, Sonsbeck (DE); Andrzej Geniusz, Mulheim an der Ruhr (DE)

(73) Assignee: Woodward Kempen, Kempen (DE)

( * ) Notice: Subject to any disclaimer, the term of this patent is extended or adjusted under 35 U.S.C. 154(b) by 369 days.

(21) Appl. No.: 12/811,721

(22) PCT Filed: Jan. 6, 2009

(86) PCT No.: PCT/EP2009/050083
§ 371 (c)(1),
(2), (4) Date: Jul. 6, 2010

(87) PCT Pub. No.: WO2009/087150
PCT Pub. Date: Jul. 16, 2009

(65) Prior Publication Data
US 2010/0277134 A1    Nov. 4, 2010

(30) Foreign Application Priority Data

Jan. 7, 2008 (DE) .......................... 10 2008 003 299

(51) Int. Cl.
*F03D 9/00* (2006.01)

(52) U.S. Cl.
USPC .......................................................... 290/44

(58) Field of Classification Search
USPC .......................................... 290/43–44, 54–55
See application file for complete search history.

(56) References Cited

U.S. PATENT DOCUMENTS

| 5,610,453 | A | 3/1997 | Smith |
| 6,337,804 | B1 | 1/2002 | Kea et al. |
| 6,448,735 | B1 | 9/2002 | Gokhale et al. |
| 8,207,623 | B2 * | 6/2012 | Rivas et al. ..................... 290/44 |
| 2002/0044472 | A1 | 4/2002 | Arnet et al. |
| 2005/0024902 | A1 | 2/2005 | Hiti et al. |

FOREIGN PATENT DOCUMENTS

| CN | 101091305 A | 1/2002 |
| DE | 19920505 A1 | 11/2000 |
| EP | 0413966 A2 | 2/1991 |
| EP | 0792008 A3 | 8/1997 |
| EP | 1770851 A2 | 4/2007 |
| JP | 07255166 A | 10/1995 |

OTHER PUBLICATIONS

Office action dated Oct. 26, 2012 in corresponding Chinese Application No. 200980101776.x.

* cited by examiner

*Primary Examiner* — Jean F Duverne
(74) *Attorney, Agent, or Firm* — Rankin, Hill & Clark LLP

(57) ABSTRACT

The invention relates to a method for operating a wind energy plant having a double-fed asynchronous machine, at least one inverter and at least one control device, wherein electrical energy is at least partly supplied into a grid via the inverter, the inverter comprises per phase at least one power semi-conductor module with at least two transistor circuits and at least two free-wheeling diodes and the inverter by using the control device is actuated at least at times via a pulse width modulation (PWM). The object, namely of providing a generic method for operating a wind energy plant in which an improved power output is effected even in the low-noise rotational speed range of the rotors, is achieved in that, at frequencies of the current to be impressed by the inverter on the machine side of less than 10 Hz, preferably less than 6 Hz, the switching-on duration and/or the switching frequency of the transistor circuits and/or of the free-wheeling diodes of the inverter are altered via the control device by taking their thermal heating into account.

13 Claims, 5 Drawing Sheets

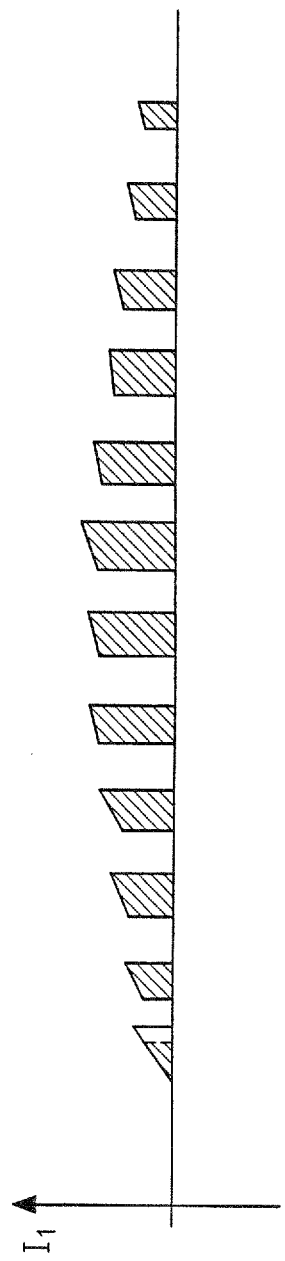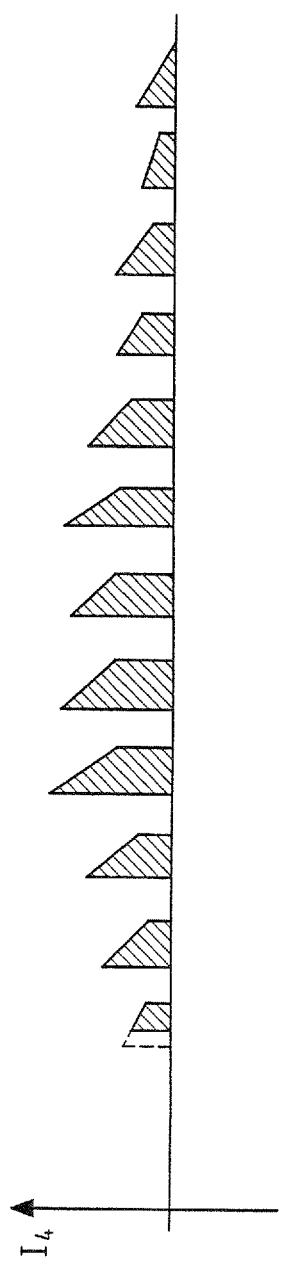

METHOD FOR OPERATING A WIND ENERGY INSTALLATION

Figure 1:
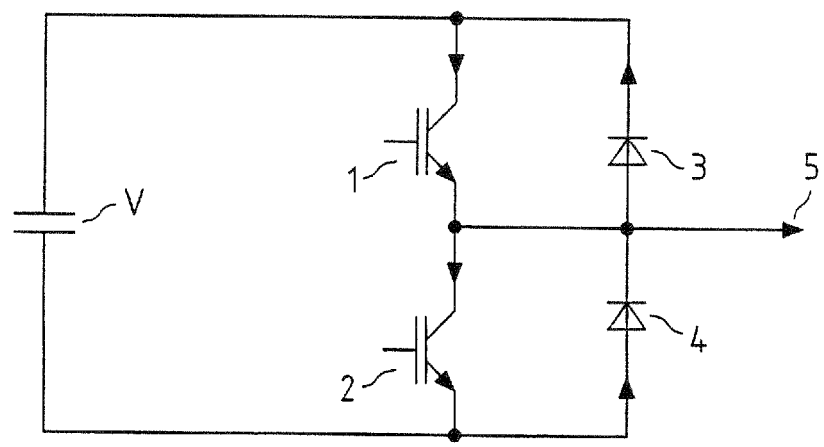

The invention relates to a method for operating a wind energy plant having a double-fed asynchronous machine, at least one inverter and at least one control device, wherein electrical energy is at least partly supplied to a grid via the inverter, the inverter comprises per phase at least one power semi-conductor module with at least two transistor circuits and at least two free-wheeling diodes and the inverter by using the control device is actuated at least at times via a pulse width modulation (PWM). In addition, the invention relates to a computer program and to a computer program product for carrying out the method by using a processor and to a control device of a double-fed asynchronous machine of a wind energy plant and to a wind energy plant.

Wind energy plants are having increasingly higher demands put on them with regard to their efficiency and low noise levels. Since the noise emission of the wind energy plant is rising with increasing rotor speed, a simple way to reduce the noise emission of a wind energy plant is to reduce its rotor speeds. In reducing the rotor speeds, it can be that the double-fed asynchronous machine has to be operated for a longer time in the synchronous operating range. Usually, with the double-fed asynchronous machine the inverter is provided on the rotor side. In the synchronous operating range, currents with very low frequencies in the range of a few Hertz are impressed on the rotor side, which are provided via an inverter on the machine side. The inverter on the machine side is, therefore, operated depending on the frequency of the currents to be impressed on the rotor side. The inverter is controlled conventionally via a pulse width modulation, in which the nominal currents required on the rotor side are determined with a high, constant frequency and the power semi-conductor modules of each phase of the inverter are switched on and off to produce the rotor currents. At very low frequencies, the components of the power semi-conductor modules, usually these are a transistor circuit and a free-wheeling diode of a corresponding phase, are not uniformly loaded in time but are, in fact, in relation to their thermal cooling behaviour, loaded at points in time. The components of the power semi-conductor modules, in most cases two IGBT modules and two free-wheeling diodes per phase, are heated strongly due to the longer switching-on duration without the heat loss allowing a reduction in the temperature. Due to the thermal behaviour of the transistor circuits or the free-wheeling diodes, respectively, these are partly heated to their maximum component temperature. The only possibility of preventing a corresponding heating in the synchronous operating range of the double-fed asynchronous machine is to reduce the rotor currents in this rotor speed range. This leads to a distinct drop in power in these rotor speed ranges. The use of additional transmissions to prevent these speed ranges does not seem practicable, since each additional mechanical implementation is prone to wear. Another possibility of preventing dips in power consists of over-sizing the inverter and therewith the power semi-conductor modules, so that these are also not heated too strongly in the synchronous operating range. However, what makes this unfavourable are considerably higher investment costs associated with this.

Taking this prior art as the starting point, the object forming the basis of the invention is to provide a generic method for operating a wind energy plant, in which there is an improved power output also in the low-noise rotor speed range.

The above disclosed object is achieved according to a first teaching of the present invention by a generic method, in that at frequencies of the currents to be impressed by the inverter on the machine side of less than 10 Hz, preferably less than 6 Hz, the switching-on duration and/or the switching frequency of the transistor circuits and/or of the free-wheeling diodes of the inverter are altered via the control device depending on their thermal behaviour.

In contrast to conventional actuation of the power semi-conductors via a PWM, according to the invention heating of the power semi-conductor modules can be affected, so that it is possible to select heating of the transistor circuits and/or of the free-wheeling diodes in a targeted way, i.e. by deviating from the conventional PWM method with a constant pulse frequency. As a result, better heat distribution can be achieved, for example, via distribution of the current paths onto different free-wheeling diodes or transistor circuits, respectively, of the individual phases. As a consequence, the power output of the wind energy plant does not have to be reduced or does not have to be so markedly reduced, since higher output currents can be produced with the same arrangement.

If, according to a first embodiment of the present invention, an inverter is used on the rotor side, the dimensions of the inverter can be smaller because it is arranged on the rotor side, since the greatest part of the electrical power output is supplied to the grid on the stator side.

According to a subsequent exemplary embodiment of the method according to the invention, the further improved power output of a wind energy plant in the synchronous operating range of the double-fed asynchronous machine can be obtained by the switching-on duration and/or the switching frequency of the transistor circuits and of the free-wheeling diodes being selected at least dependent in each case on the relation between the respective component temperature and the maximum junction temperature. This embodiment of the method according to the invention takes into account the fact that the energy losses of the free-wheeling diodes and the transistor circuits, which is usually formed as IGBT modules, are different, so that there are different component temperatures with the same current load on the transistor circuit and the free-wheeling diode. By taking account of the different heating behaviour, additional reserves can be exploited in the power semi-conductor module without entering into the range of critical junction temperatures for the component temperature.

If the dependency of the switching-on duration and/or of the switching frequency of the transistor circuits and of the free-wheeling diode on the component temperature is predetermined by simulating the thermal behaviour of the components, the heating of the components can be estimated simply and can be taken into account at current frequencies on the machine side of less than 10 Hz, in particular less than 6 Hz.

Cumulative or as an alternative to simulating the thermal behaviour of the components depending on the switching-on duration or the switching frequency, respectively, it is possible to determine the component temperatures via sensors.

Temperature sensors are in the majority of cases not placed directly on the components themselves, for example on the free-wheeling diodes, but close to them, so that heating of the free-wheeling diode or of the IGBTs can be determined via a temperature model. Via the temperature model, the sensor delivers a measure for the current component temperature, so that particularly together with a simulation of the thermal behaviour, an even more precise utilisation of the component reserves with regard to the maximum component temperature is made possible.

The thermal heating of the components is, in addition, determined by power dissipations which are produced in particular during the switching-on and switching-off operations. If, according to a subsequent embodiment of the method according to the invention, the number of switching operations is reduced in the power semi-conductor module, additional power reserves can, therefore, be obtained at the same time.

Preferably, to reduce the switching operations, the power semi-conductor modules are actuated by using a flat top method or via pre-calculated pulse patterns. In the flat top method, instead of a space vector modulation, within a predetermined angle region for the voltage or current vector, respectively, to be modulated, precisely one output voltage or one output current, respectively, of a component is left at full-scale output and the number of switching operations is thereby reduced. Typical angle regions of the current or voltage vector, in which the modulation is kept constant, are 30°, 60° and 120°. With pre-calculated pulse patterns, these are calculated in advance by taking various parameters into account, for example also the different power dissipations and junction temperatures of the transistor circuits and of the free-wheeling diodes, and stored as pulse patterns for whole periods in a table. In operation, the control device only outputs the pulse pattern corresponding to the input variables, for example to the rotor currents to be impressed, to control the inverter on the machine side. The switching frequency can also be reduced simply in this way, since the operating ranges with a lower current frequency on the machine side can be operated with lower switching frequencies.

According to a second teaching of the present invention, the above disclosed object is achieved by a computer program with commands, the execution of which causes a processor to carry out the method according to the invention. The same applies for a computer program product which contains a computer program with commands, the execution of which causes a processor to carry out the method according to the invention. Reference is made to the description of the method according to the invention regarding the advantages of the computer program or, respectively, the computer program product according to the invention.

According to a fourth teaching of the present invention, the above disclosed object is achieved by a control device of a double-fed asynchronous machine of a wind energy plant, wherein the control device controls an inverter of a double-fed asynchronous machine for supplying electrical energy to a grid and means are provided for actuating the inverter according to the method according to the invention. The control device according to the invention enables a double-fed asynchronous machine of a wind energy plant to also be operated in the synchronous operating range without the power output having to be significantly lowered.

Finally, the same applies for a wind energy plant comprising a double-fed asynchronous machine, at least one inverter and a control device for carrying out the method according to the invention, wherein the wind energy plant can be operated in rotor speed ranges with lower noise emission.

Figure 4:
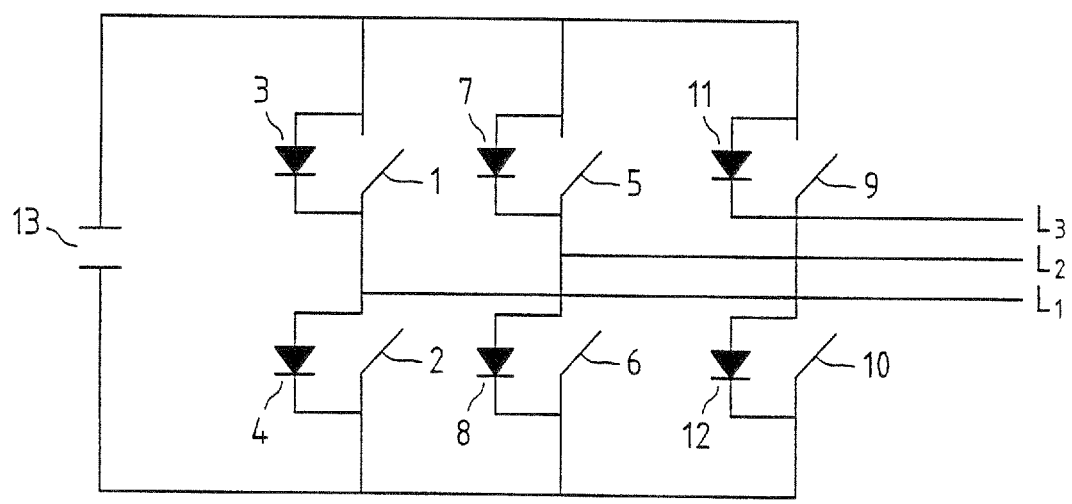
Figure 5:
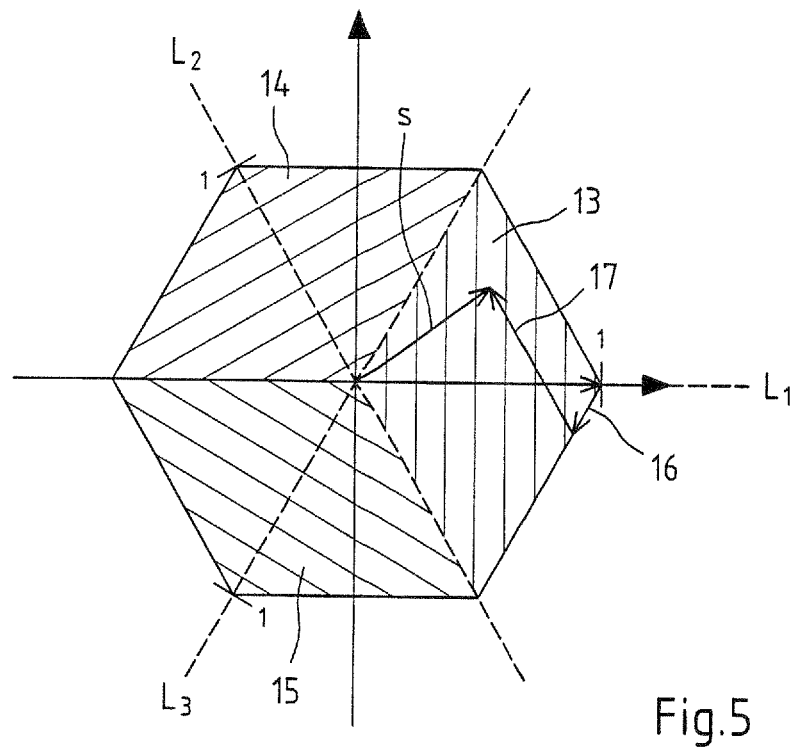
Figure 6:
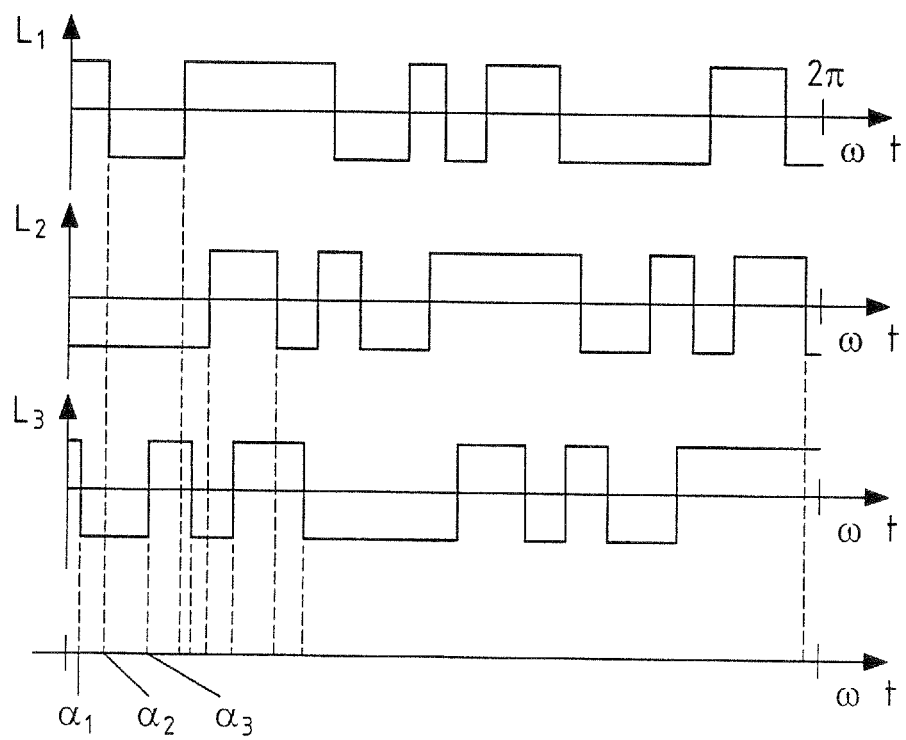
Figure 7:
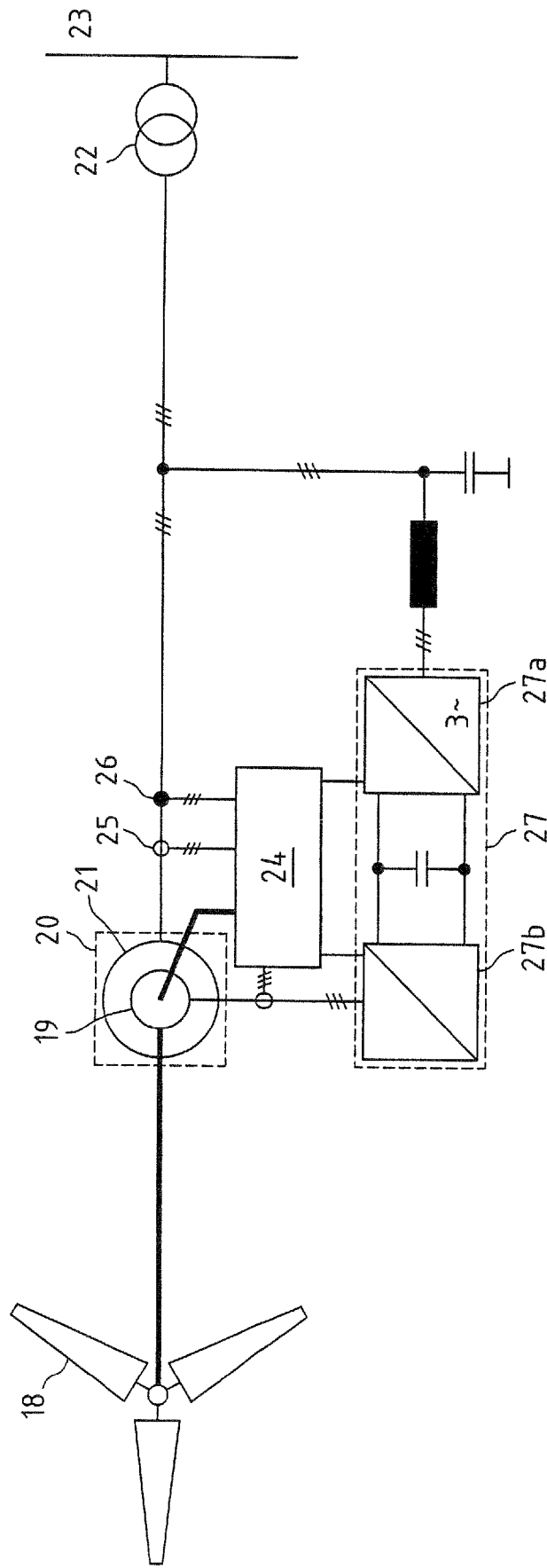

There are now many possibilities for developing and refining the method according to the invention, the control device and the wind energy plant. Reference is made, in this connection, to the claims subordinate to Claim 1, on the one hand, and to the description of exemplary embodiments associated with the drawing, on the other hand. In the drawing FIG. 1 shows a circuit diagram of a power semi-conductor module from the prior art, as it is used in wind energy plants per current or voltage phase, respectively, FIGS. 2a) to 2c) show typical current-time graphs of pulse width modulation control of the power semi-conductor module from FIG. 1, FIGS. 3a) and 3b) show current-time graphs of the power semi-conductor module from FIG. 1 actuated according to an exemplary embodiment of the method according to the invention, FIG. 4 shows a circuit diagram of the three-phase inverter on the machine side, as is known from the prior art, FIG. 5 shows a space vector diagram of a further exemplary embodiment of the method according to the invention according to the flat top method, FIG. 6 shows pulse patterns for actuating the power semi-conductor modules of the circuits L1, L2, L3 according to another exemplary embodiment of the method according to the invention and FIG. 7 shows a schematic illustration of an exemplary embodiment of a wind energy plant according to the invention.

Figure 2A:
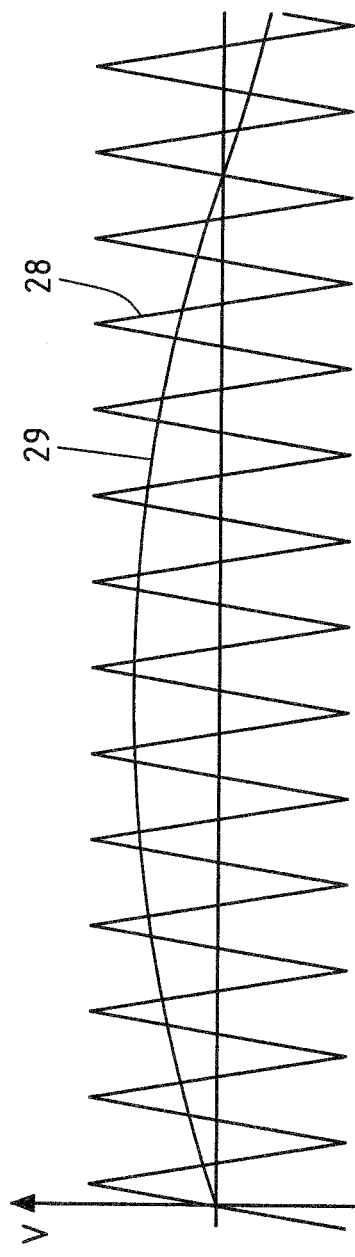

FIG. 1 firstly shows a circuit diagram of a one-phase inverter, as it is known from the prior art. The transistor circuits 1 and 2, which are usually designed as IGBT modules, together with the parallel-connected free-wheeling diodes 3 and 4, make sure that by switching or, respectively, triggering the IGBT modules 1 and 2 a corresponding current with a positive or, respectively, a negative sign flows at the output 5. For example, the IGBT module 1, together with the free-wheeling diode 4, provides a current flow with a positive sign. The opposite applies for the IGBT module 2 together with the free-wheeling diode 3. The IGBT modules 1, 2 and the free-wheeling diodes 3, 4 are connected to a voltage source V which, for example, can be the intermediate circuit voltage of the inverter. The voltage-time graph in FIG. 2a) now shows the course of a control voltage 28, which is used to control the inverter, and the course of an associated auxiliary voltage 29, as it is used in conventional pulse width modulation. The corresponding IGBT modules are switched on and off at intersection points of the auxiliary voltage 29 and the control voltage 28.

Figure 2B:
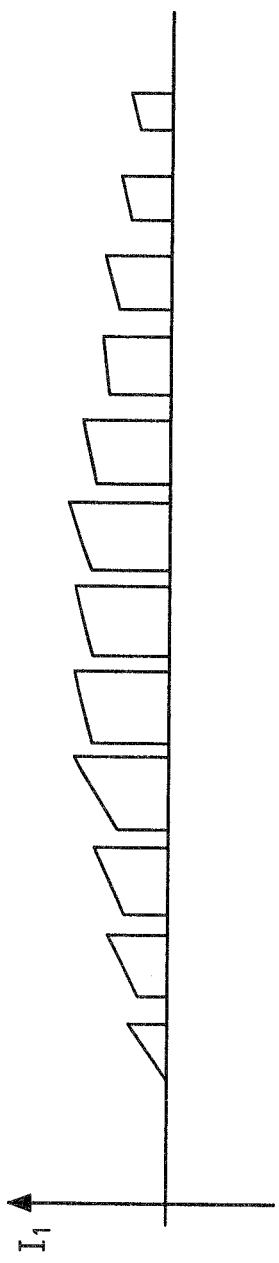
Figure 2C:
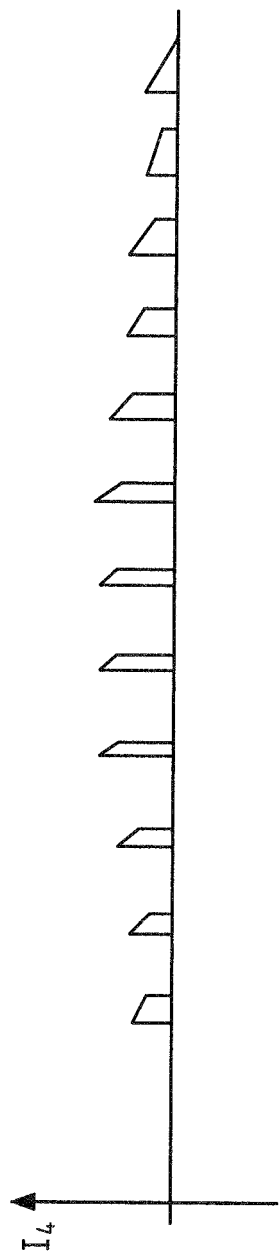

For the positive half-wave of the control voltage 28, the corresponding currents in the IGBT modules 1 $I_1$ and in the free-wheeling diode 4 $I_4$ are illustrated in FIGS. 2b) and 2c). It can be seen in FIG. 2b) that during the positive half-wave of the control voltage 28 the IGBT module 1 is considerably more strongly involved in supplying electric current than the associated free-wheeling diode 4. If the control voltage 28 has a sufficiently high frequency, for example a grid frequency of 50 to 60 Hz, a thermal equilibrium arises due to the slow dissipation of heat from the IGBT modules 1, 2 or, respectively, the free-wheeling diodes 3, 4, which leads to constant heating of the modules or, respectively, the free-wheeling diodes, wherein the maximum current output of the one-phase inverter illustrated in FIG. 1 is determined via the constant heating of the power semi-conductors 1, 2, 3, 4 compared to the maximum permitted junction temperature of the respective components.

In the case of particularly low control voltage frequencies, for example of less than 10 Hz or 6 Hz, as occur for example in the synchronous operating range of double-fed asynchronous machines, it is easily conceivable that the control voltage 28 takes the same value over a considerably longer period of time. In the present example, this leads to the IGBT module 1 being actuated for a considerably longer period of time in relation to the free-wheeling diode 4 and in this respect is subject to very much stronger heating and no equilibrium can arise between heating and heat dissipation.

Moreover, a comparison of FIGS. 2b) and 2c) shows that, independent of the thermal properties of the components, i.e. of the IGBT modules 1 or of the free-wheeling diode 4, respectively, actuation takes place via the pulse width modulation. It can be clearly seen that the free-wheeling diode 4 has substantially shorter circuit cycles or current-carrying time cycles, respectively.

In FIGS. 3a) and 3b), a current-time graph is now shown which is produced by applying the method according to the invention, wherein the switching-on and switching-off phases of the IGBT module 1 and the free-wheeling diode 4 are selected by departing from conventional pulse width modulation. The switching-on duration of the free-wheeling diode 4 or of the IGBT module 1, respectively, can, for example, be advantageously selected dependent on the relation between the respective component temperature and the maximum junction temperature of the IGBT module or the free-wheeling diode, respectively. In the present example, the free-wheeling diode 4 has considerably greater reserves in relation to the maximum junction temperature and is actuated longer than by conventional means. The switching-on duration of the IGBT module 1 is reduced in order to distribute the current flow over both components better. Overall, power dissipations are distributed better onto both of the components, IGBT module 1 and free-wheeling diode 4. Preferably, the switching-on duration is selected such that the component temperatures of the IGBT module 1 and the free-wheeling diode 4 have the same reserves compared to the maximum permitted junction temperature.

In order to explain another embodiment of the method according to the invention in more detail, a circuit diagram of a three-phase inverter is illustrated in FIG. 4, in which the IGBT modules are represented as switches 1, 2, 5, 6, 9, 10. Free-wheeling diodes 3, 4, 7, 8, 11, 12 are in each case provided for each IGBT module 1, 2, 5, 6, 9, 10. The power semi-conductors 1, 2, 3, 4 supply phase L1, the power semi-conductors 5 to 8 supply phase L2 and the power semi-conductors 9 to 12 supply phase L3 with current.

The three-phase configuration can now be taken into account in order to reduce the number of switching operations in power semi-conductor modules, according to a subsequent exemplary embodiment of the method according to the invention, so that lower power dissipations occur and heating of the individual power semi-conductors is thereby lower.

The space vector diagram in FIG. 5 shows three space vector regions 13, 14, 15, in which, according to the method according to the invention, a component, for example L1, is kept at full-scale output. Any voltage or, respectively, current space vector s within the region 13 can then be produced by a vector addition of the components along the axes L1, L2 and L3, wherein, as already stated, the component L1 is at full-scale (=1) output in the space vector region 13. The associated vector addition occurs by switching other power semi-conductor modules of the phases L2 and L3, which are designated here by 16 and 17. In the present exemplary embodiment, the space angle region in which a component is at full-scale output is 60°. However, the space angle region can also be selected differently, for example 30°. It becomes clear that the components of phase L1, the components 1, 2, 3, 4, are not switched in the selected space angle region because these are at full-scale output, so that the number of switching operations in a current path is reduced. The reduction in switching operations in turn leads to a reduction in heat losses in the power semi-conductors, so that their current output can be increased.

Another possibility to reduce the number of switching operations is achieved in that pre-calculated pulse patterns are used in order to actuate the power semi-conductors. FIG. 6 shows corresponding pulse patterns for actuating the power semi-conductors of the individual phases L1, L2, and L3. For each angle position $\alpha_1$, $\alpha_2$, $\alpha_3$ a specific switching pattern is stored in a table and called according to the phasing. The number of switching operations can be further reduced by optimising the pulse patterns on low switching frequencies and their thermal impact on the power semi-conductors. As a result, as in the flat top method, less power dissipation is produced in the power semi-conductors, which leads to an improvement in the power reserves.

Finally, FIG. 7 shows in a diagram a wind energy plant with a propeller 18 which is connected optionally via a transmission, which is not illustrated, to the rotor 19 of the double-fed asynchronous machine 20. The stator 21 of the double-fed asynchronous machine 20 in the present exemplary embodiment is connected to a grid 23 via a transformer 22. In the present exemplary embodiment, a control device 24 determines the rotor speed and compares this to the voltages or currents at the stator 21, respectively, determined via the measuring points 25 and 26. The control device 24 is connected to the inverter 27 provided on the rotor side and controls, on the one hand, the inverter 27a provided on the grid side and, on the other hand, the inverter 27b provided on the machine side. If now, due to a reduction in the rotor speed, the wind energy plant reaches the synchronous operating range, for example in order to reduce the noise emission, currents with the lower frequency are impressed via the rotor. Up to now, as already stated, the power output of the wind energy plant was considerably reduced at frequencies of less than 10 Hz or less than 6 Hz, respectively, in order to protect the power semi-conductors from overheating.

In contrast, the wind energy plant according to the invention switches, via the control device 24 according to the invention, from the conventional pulse width modulation actuation of the inverter 27b at current frequencies of less than 10 Hz or 6 Hz, respectively, to the method according to the invention, which method alters the switching-on duration and/or the switching frequencies of the transistor circuits and free-wheeling diodes depending on their thermal behaviour. By altering the actuation procedure, the reduction in power within the synchronism of the double-fed asynchronous machine with an unchanged dimensioning of the inverter on the rotor side does not prove to be as sharp as was customary up to now. As a result, the wind energy plant can also be operated in low-noise rotor speed ranges without recording a great loss of power.

The invention claimed is:

1. A method for operating a wind energy plant having a double-fed asynchronous machine, at least one inverter and at least one control device, wherein electrical energy is at least partly supplied to a grid via the inverter, wherein the inverter comprises per phase at least one power semi-conductor module having at least two transistor circuits and at least two free-wheeling diodes as components, and wherein the control device actuates the inverter at least at times via a pulse width modulation (PWM), the method comprising:
    altering, at frequencies of currents to be impressed by the inverter on a machine side of less than 10 Hz, the switching frequency of the transistor circuits and/or of the free-wheeling diodes of the inverter via the control device depending upon the thermal heating of the respective components such that the number of switching operations in the power semi-conductor module is reduced.

2. The method according to claim 1, wherein the inverter is used on the rotor side.

3. The method according to claim 1, further comprising:
    altering, at frequencies of the currents to be impressed by the inverter on the machine side of less than 10 Hz, the switching-on duration of the transistor circuits and/or of the free-wheeling diodes of the inverter via the control device depending upon the thermal heating of the respective components such that the number of switching operations in the power semi-conductor module is reduced.

4. The method according to claim 3, wherein the switching-on duration and/or the switching frequency of the transistor circuits and/or of the free-wheeling diodes is/are selected at least dependent in each case on a relationship between a temperature of the respective components and a maximum junction temperature.

5. The method according to claim 3, wherein the switching-on duration of the transistor circuits and of the free-wheeling diodes is selected such that a temperature of the respective component in each case is proportionate to a maximum junction temperature of the respective component.

6. The method according to claim 3, wherein the dependency of the switching-on duration and/or of the switching frequency of the transistor circuits and/or of the free-wheeling diode on the respective component temperature is predetermined by means of simulating the thermal behaviour of the components.

7. The method according to claim 1, wherein temperatures of the components are determined via sensors.

8. The method according to claim 1, wherein, during the altering step, the power semi-conductor modules are actuated by using a flat top process or via pre-calculated pulse patterns in order to reduce the switching operations.

9. The method according to claim 3, wherein at frequencies of the currents to be impressed by the inverter on a machine side of less than 6 Hz, the switching-on duration and/or the switching frequency of the transistor circuits and/or of the free-wheeling diodes of the inverter is/are altered via the control device by taking their thermal heating into account in that the number of switching operations in the power semi-conductor module is reduced.

10. A computer program with commands, the execution of which causes a processor to carry out the method according to claim 1.

11. A computer program product which contains a computer program with commands, the execution of which causes a processor to carry out the method according to claim 1.

12. A control device of a double-fed asynchronous machine of a wind energy plant, wherein the control device controls an inverter of a double-fed asynchronous machine for supplying electrical energy to a grid and means are provided for actuating the inverter according to a method according to claim 1.

13. A wind energy plant comprising a double-fed asynchronous machine, at least one inverter and a control device for carrying out a method according to claim 1.

* * * * *